United States Patent [19]

Gutman et al.

[11] Patent Number: 5,748,100
[45] Date of Patent: May 5, 1998

[54] RELIABLE WIRELESS MESSAGE DISTRIBUTION SYSTEM

[75] Inventors: Jose Gutman, Boynton Beach; James A. Wright, Coral Springs, both of Fla.

[73] Assignee: Motorola, Inc., Schaumburg, Ill.

[21] Appl. No.: 539,891

[22] Filed: Oct. 6, 1995

[51] Int. Cl.⁶ .................................................. H04Q 7/14
[52] U.S. Cl. ................... 340/825.44; 340/825.47; 340/825.54; 455/31.3; 370/312
[58] Field of Search ................... 340/825.44, 825.54, 340/825.08, 825.47; 455/38.2, 31.3; 371/32, 33; 370/346, 312

[56] References Cited

U.S. PATENT DOCUMENTS

| | | | |
|---|---|---|---|
| 4,590,473 | 5/1986 | Burke et al. | 340/825.44 X |
| 4,646,082 | 2/1987 | Engel et al. | 340/825.54 |
| 4,875,038 | 10/1989 | Siwiak et al. | |
| 4,970,714 | 11/1990 | Chen et al. | 371/32 X |
| 5,124,697 | 6/1992 | Moore. | |
| 5,153,582 | 10/1992 | Davis. | |
| 5,168,493 | 12/1992 | Nelson et al. | |
| 5,245,616 | 9/1993 | Olson | 371/32 |
| 5,570,367 | 10/1996 | Ayanoglu et al. | 370/346 |

*Primary Examiner*—Edwin C. Holloway, III

[57] ABSTRACT

An acknowledge-back selective call system (100) transmits a first acknowledge-back page (300) that includes a first message data (306) and address information (302) that matches a first predetermined address (140) at an acknowledge-back selective call transceiver (130) and a second acknowledge-back page (300) that includes a second message data (306) and address information (302) that matches a second predetermined address (142) at the acknowledge-back selective call transceiver (130). The acknowledge-back selective call transceiver (130) receives the second acknowledge-back page (300), and, in response thereto, transmits an acknowledge-back confirmation response (500), the acknowledge-back confirmation response (500) including a message reception status information (502) indicating a message reception status for the first acknowledge-back page (300) and a message reception status information (504) indicating a message reception status for the second acknowledge-back page (300).

1 Claim, 8 Drawing Sheets

AB GROUP 1, MESSAGE 1

| GROUP MEMBER ADDRESS (402) | ACKNOWLEDGED RECEPTION (404) | NEXT GROUP PAGE TIME (406) |
|---|---|---|
| 2 | NO | 8/31/95 AT 3 A.M. |
| 4 | NO | 8/31/95 AT 3 A.M. |
| 6 | NO | 8/31/95 AT 3 A.M. |
| • | • | • |
| • | • | • |
| • | • | • |

400 ns and more specifically to a method and apparatus for increasing communication throughput and for reducing contention among transmissions in a two-way selective call system.

RELIABLE WIRELESS MESSAGE DISTRIBUTION SYSTEM

FIELD OF THE INVENTION

This invention relates in general to selective call communications and more specifically to a method and apparatus for increasing communication throughput and for reducing contention among transmissions in a two-way selective call system.

BACKGROUND OF THE INVENTION

Contemporary selective call systems, e.g., paging systems, employ messaging schemes that can typically deliver voice, numeric, or alphanumeric messages to subscribers. The majority of selective call systems transmit address and message information using a communication protocol such as Great Britain's Post Office Code Standardization Advisory Group, POCSAG, or Motorola's Golay Sequential Code, GSC. More recently, the ReFlex™ protocol of Motorola, Inc., of Schaumburg, Ill. allows selective call systems to handle two-way communication, e.g., acknowledge-back (ack-back) messaging, with portable transceivers, such as with the Motorola Tango™ personal messaging unit (PMU), or pager. In an ack-back communication system a central system can send wireless messages to a portable transceiver unit such as a PMU, and the PMU can send wireless messages to the central system.

Two-way communication allows a central system to verify that a portable transceiver unit (portable unit) received a wireless message transmitted by the central system and destined for reception by the portable unit. A confirmation wireless message, e.g., an ack-back response message, sent from the portable unit back to the central system in response to having received a wireless message therefrom provides an affirmative confirmation back to the central system that the wireless message was reliably delivered and received by the portable unit. This handshake messaging, i.e., sending a confirmation response message back to a central system for each wireless message received by a portable unit, can significantly enhance the reliability of communication in a selective call system. However, the increased number of transmitted messages due to the handshake messaging increases the message communication and message processing time delays in the selective call system. This added delay tends to reduce the message communication efficiency of the selective call system, which may not be acceptable under certain operational conditions of the selective call system, as will be discussed below.

Under certain operational conditions in the selective call system, for example, messaging traffic may be high for an available message communication throughput capacity for the selective call system. Any significant additional message traffic can detrimentally affect the operational efficiency of system resources, such as limited by a messaging throughput capacity of a wireless communication channel, or limited by a messaging throughput capacity of communication links, or limited by an operational efficiency of central system resources such as near-full memory queues or overloading of tasks for devices that handle messaging operations, or a combination of all of the above communication phenomena.

Generally, the number of messages that a selective call system can handle during peak communication traffic periods constrains the number of total customers that can be serviced by the selective call system. The total number of customers handled by the selective call system typically determines the commercial viability of the selective call system.

Furthermore, although conventional ack-back messaging can maintain a high level of reliability in message communication by sending an immediate ack-back message in response to every wireless message received by a portable unit, under certain messaging conditions transmitting an immediate ack-back message response for every wireless message received by a portable unit may not be commercially practicable.

Specifically, to enhance the likelihood of commercial viability of a selective call system the messaging throughput capacity of the selective call system should be as high as possible. Normally, a selective call system has a one-way messaging throughput capacity that is constrained by the maximum number of wireless messages that the central system can transmit to the portable units over a unit of time. The selective call system also has a two-way messaging throughput capacity that is constrained by the maximum number of wireless messages that the central system can transmit to portable units while the portable units send ack-back messages back to the central system in response to receiving the wireless messages therefrom over a unit of time. For a particular selective call system, the one-way messaging throughput capacity is normally higher than the two-way messaging throughput capacity. Therefore, to enhance the likelihood of commercial viability of a selective call system the messaging throughput capacity of the selective call system should be as high as possible, preferably approaching the one-way messaging throughput capacity that is higher than the two-way messaging throughput capacity.

As a first example, under high communication traffic conditions the selective call system's total messaging throughput capacity can be significantly constrained by the messaging throughput capacity consumed by the portable units sending ack-back response messages to the central system. The additional communication traffic and processing time delays due to the ack-back response messages may reduce the total number of wireless messages that can be delivered by the selective call system during the high communication traffic conditions.

As a second example, the central system may transmit a multi-recipient ack-back wireless message (a group page) destined for a large group of recipient portable units. This may be the case while providing information services to subscribers of the selective call system, or while providing data updates to members of ack-back groups in the selective call system, or generally while providing wireless messages to members of ack-back groups in the selective call system. In response to receiving the group page, recipient portable units would transmit back to the central system their ack-back response messages to confirm a message reception status for the group page. The large number of ack-back response messages that the selective call system would have to handle over a relatively short amount of time could severely reduce, if not totally bottleneck, the wireless messaging throughput of the selective call system. Such a reduction in the wireless messaging throughput would create significant message communication delays in the selective call system. Typically, this condition would not be acceptable to customers of the selective call system thereby detrimentally affecting the commercial viability of the selective call system.

Thus, what is needed is a method and apparatus, in an acknowledge-back selective call system, for increasing the reliability of communication under the varying message communication traffic loads and the two-way messaging communication requirements of the acknowledge-back selective call system.

DESCRIPTION OF THE PREFERRED EMBODIMENT

Figure 1:
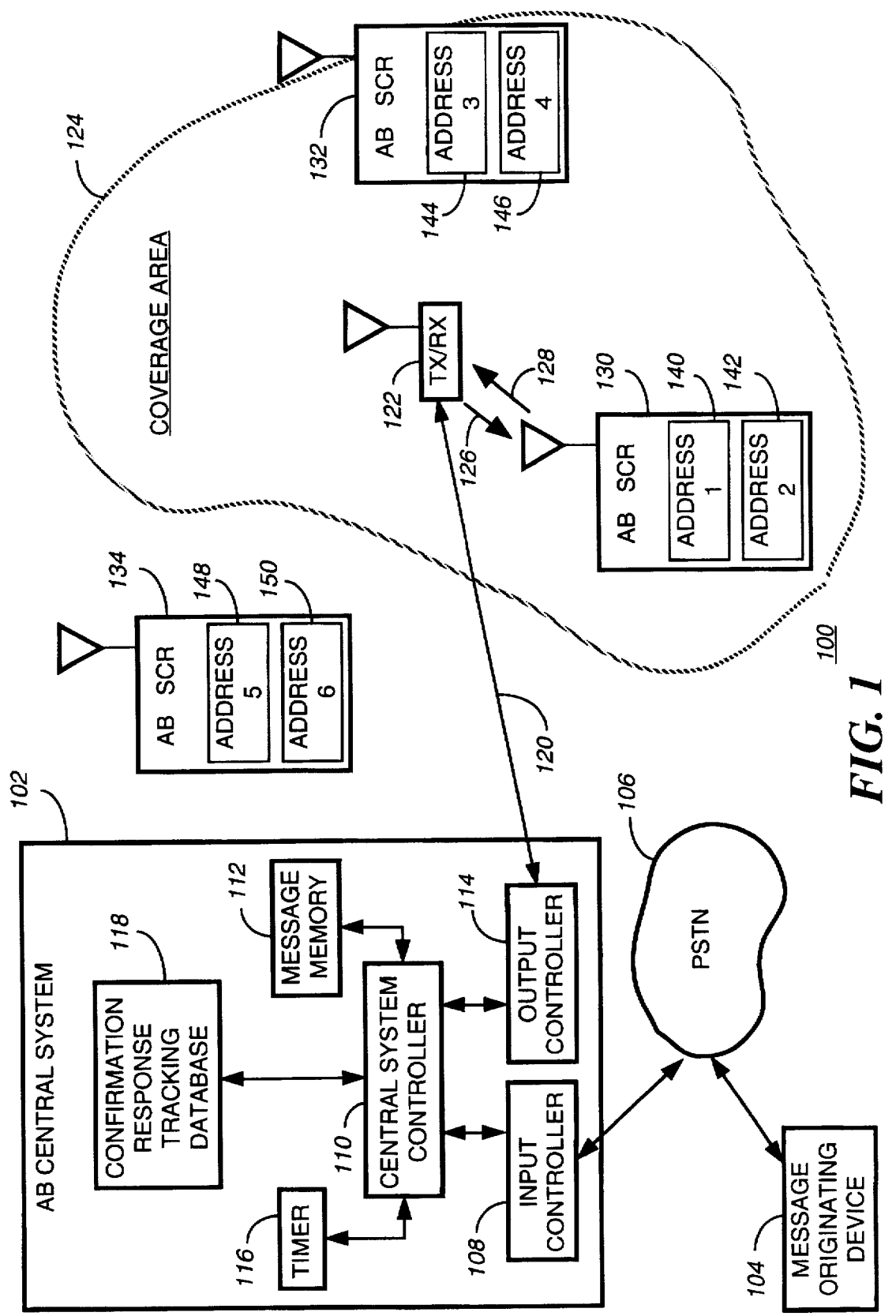
FIG. 1 illustrates an acknowledge-back selective call system in accordance with the present invention.

Referring to FIG. 1, an acknowledge-back selective call system 100 (hereinafter, selective call system) delivers acknowledge-back pages to subscribers thereof, according to the preferred embodiment of the present invention. Preferably, the selective call system 100 utilizes the Motorola ReFlex™ communication protocol to deliver messages to and from subscribers of the selective call system 100. The ReFlex protocol is more fully described in the following U.S. Pat. applications assigned to the assignee of the present invention: Ser. No. 08/131,243 entitled "Method and Apparatus for Identifying a Transmitter in a Radio Communication System" filed Oct. 4, 1993 by Simpson et al.; U.S. Pat. Ser. No. 08/398,274 entitled "Method and Apparatus for Optimizing Receiver Synchronization in a Radio Communication System" filed Mar. 3, 1995 by Ayerst, et al.; U.S. Pat. Ser. No. 08/404,698 entitled "Method and Apparatus for Improved Message Reception at a Fixed System Receiver" filed Mar. 15, 1995 by Ayerst et al.; U.S. Pat. Ser. No. 08/498,212 entitled "Forward Channel Protocol to Enable Reverse Channel Aloha Transmissions" filed Jul. 5, 1995 by Ayerst et al.; and U.S. Pat. Ser. No. 08/502399 entitled "A System and Method for Allocating Frequency Channels in a Two-way Messaging Network" filed Jul. 14, 1995 by Wang et al., which are hereby incorporated by reference herein. However, any conventional wireless communication protocol that supports two-way paging communication can be utilized by the selective call system 100.

Specifically, an acknowledge-back central system 102 (hereinafter, central system 102) is coupled to at least one message originating device 104, such as via a public switched telephone network 106 (PSTN). The message originating device 104 comprises, for example, a telephonic entry device that utilizes dual tone multi-frequency (DTMF) signaling, or a computing device and modem arrangement utilizing modem signaling, or a page entry terminal device, or other message originating device that can be coupled via a telephone network. Further, a message originating device 104 that comprises a computing device can couple to the central system 102 via other network interfaces, such as via an Internet network interface, via an ethernet network interface, or via other high speed network interface, or even via a dedicated line interface between the message originating device 104 and the central system 102. Furthermore, a message originating device 104 that comprises a wireless network interface can couple to the central system 102 via a wireless network, such as an infrared communication network or a terrestrial or satellite-based radio frequency (RF) communication network.

An input controller 108 comprises a network interface for the central system 102 compatible with the type of network being used to couple messages from a message originating device 104. For example, the input controller 108 comprises a telephone interface to couple messages via the PSTN 106. A central system controller 110 controls the acknowledge-back paging function of the central system 102. The central system controller 110 is coupled to the input controller 108 for receiving messages associated with acknowledge-back page requests, such as that originated from the message originating device 104.

The central system controller 110 is coupled to a message memory 112 for storing acknowledge-back messages and associated information. The message memory 112 is preferably a non-volatile memory. The central system controller 110 is also coupled to an output controller 114 for transmitting outbound acknowledge-back pages containing messages or information for subscribers of the central system 102.

The central system controller 110 is also coupled to a timer 116 for keeping track of time and date information for the central system 102. The central system controller 110 can utilize the time and date information provided by the timer 116, for example, for scheduling transmission of acknowledge-back pages at predetermined times, as will be more fully discussed below.

The central system controller 110 is coupled to a confirmation response tracking database memory 118. The confirmation response tracking database memory 118 is utilized by the central system 102 to keep track of acknowledge-back paging status for subscribers of the selective call system 100, as will be more fully discussed below.

The output controller 114 is coupled via a communication link 120 to at least one acknowledge-back transceiver or selective call transceiver base station 122 (hereinafter, base station 122) that is typically located in a predefined coverage area 124. The coverage area 124 comprises a region, such as a geographical region, for conducting wireless message communication between the base station 122 and the at least one ack-back capable selective call transceiver 130 (pager). The selective call system 100 typically comprises a plurality of predefined coverage areas that cover, for example, a wide geographical territory.

The communication link 120 can comprise a direct wire-line communication link, a modem communication link such as over a telephone network, a satellite communication link, an RF communication link, or other contemporary communication linking means, or a combination of the aforementioned communication links. The base station 122 operates to transmit an outbound acknowledge-back page 126 (hereinafter, page 126) to at least one acknowledge-back selective call transceiver 130 (hereinafter, selective call transceiver 130) located within the coverage area 124. Further, the base station 122 receives an inbound acknowledge-back confirmation response, or ack-back response, 128 transmitted by the at least one selective call transceiver 130. The base station 122 forwards the ack-back response 128, via the communication link 120, to the output controller 114 of the central system 102. In this way, the central system 102 transmits a page 126 to the at least one selective call transceiver 130, and then receives an ack-back response 128 therefrom to confirm a message reception status of the page 126 for the at least one selective call transceiver 130. This two-way paging communication between the central system 102 and the at least one selective call transceiver 130 provides affirmative confirmation to the central system 102 that page 126 transmitted to the at least one selective call transceiver 130 was successfully received thereby. This message confirmation mechanism increases the overall reliability of a message delivery system because it allows the selective call system 100 to re-transmit a message to the selective call transceiver 130 until the selective call transceiver 130 acknowledges that the message was successfully received by the selective call transceiver 130.

The hardware of the central system controller 110 preferably includes a Wireless Messaging Gateway (WMG™) Administrator!™ paging terminal, a RF-Conductor!™ message distributor, and a RF-Usher!™ multiplexer, manufactured by Motorola, Inc. The controller has software elements and preferably runs under a UNIX operating system. The software elements are modified in accordance with the present invention. The hardware of the base station 122 preferably includes a Nucleus® Orchestra!™ transmitter and a RF-Audience!™ receiver, manufactured by Motorola, Inc. A more detailed description of the hardware of the central system controller 110 and of the base station 122 is described in "Introduction to The Wireless Concert!", published 1995 by Motorola, Inc., which is available for sale to the public as part No. 6880491G01 from Motorola, Inc., Ft. Worth, Tex., and which is hereby incorporated by reference herein.

The operation of the selective call transceiver 130 is described more fully in U.S. Pat. No. 5,124,697 entitled "Acknowledge Back Pager" issued Jun. 23, 1992 to Moore; U.S. Pat. No. 5,153,582 entitled "Method and Apparatus for Acknowledging and Answering a Paging Signal" issued Oct. 6, 1992 to Davis; and U.S. Pat. No. 4,875,038 entitled "Frequency Division Multiplexed Acknowledge Back Paging System" issued Oct. 17, 1989 to Siwiak et al., which are assigned to the assignee of the present invention and which are hereby incorporated by reference herein. The ack-back capable selective call transceiver 130 is preferably a Motorola Tango™ pager modified to perform the operations described hereinafter. The Tango pager is compatible with the ReFlex protocol. The Tango pager is described more fully in the Motorola Product Family 255 Service Manual published 1995 by Motorola, Inc., and in the Motorola Product Family 255 Series Controller Supplement, published 1995 by Motorola, Inc., which are available for sale to the public from Motorola Paging Products Group, Boynton Beach, Fla. as part No. 6881024B80 and part No. 68881104B36, respectively, and which are hereby incorporated by reference herein. A software element, residing in non-volatile memory, preferably read-only memory (ROM), of selective call transceiver 130 is modified to operate the microprocessor, preferably a Motorola M68HC11PH8, within the pager in accordance with the invention. A person skilled in the art of programming modifies the software using a Motorola HC11 Reference Manual, published 1991 by Motorola, Inc., and using a Motorola MC68HC11PH8 Technical Data, published 1995 by Motorola, Inc., which are available for sale to the public from Motorola, Inc., Phoenix, Ariz.

An selective call transceiver 130 may not reliably receive the page 126, or may even miss the page 126, because of certain communication conditions related to the selective call system 100. For example, a selective call transceiver 132 can be located at a fringe region of the coverage area 124 where certain wireless communication phenomena such as noise interference and other interference signals can detrimentally affect the reliable reception of pages. A selective call transceiver 134 can be located, as a second example, outside of the coverage area 124 consequently not being capable of receiving pages 126. Furthermore, the selective call transceiver 130, even if located within the coverage area 124, can miss reception of a transmitted page 126. For example, a physical blocking structure, e.g., a steel beam structure in a building or other similar RF blocking structure, can be located within the coverage area 124 interposed between the base station 122 and the selective call transceiver 130 thereby preventing a transmitted signal comprising page 126 from reaching the selective call transceiver 130. Additionally, the power of the selective call transceiver 130 can have been turned off at the time when the signal comprising the page 126 was transmitted by the base station 122. Consequently, the selective call transceiver 130 would not receive the transmitted page 126 from the base station 122.

Under certain communication conditions, it can be undesirable for the at least one selective call transceiver 130 to transmit the ack-back response 128 to the central system 102. For example, under high message communication traffic conditions, such as can exist from time to time in the coverage area 124 or in the communication link 120, the acknowledge-back message communication throughput capacity of the selective call system 100 can severely limit the number of additional wireless pages 126 (i.e., a single recipient acknowledge-back page) that can be handled by the selective call system 100. The additional message communication and processing time required to transmit ack-back responses 128 to the central system 102 for the pages 126 that were received by the at least one selective call transceiver 130 consume the available message communication throughput capacity. This available message communication throughput capacity could be alternatively better utilized to transmit additional wireless pages 126 without immediately transmitting the ack-back responses 128 therefor to help improve the overall wireless message communication throughput of the selective call system 100, such as during peak message communication traffic conditions.

As a second exemplary communication condition, a multi-recipient acknowledge-back page (hereinafter, group page) is transmitted by the selective call system 100 for reception by a large group of selective call transceivers 130, 132, 134. The selective call system 100 broadcasts, via at least one multi-recipient page, many different types of information to subscribers of the selective call system 100. For example, the selective call system 100 can broadcast information services such as news, weather, sports, financial information and other useful information to subscribers of the selective call system 100. The selective call system 100, as a second example, can broadcast at least a portion of a software program for delivering software updates, via at least one group page, to subscribers of the selective call system 100 and to the software update service. As a third example, the selective call system 100 can broadcast, via at least one group page, group messages to members of the group, such as a work group, or a group of family members or friends.

A transmission of a group page to a large group of selective call transceivers 130, 132, 134, such as discussed above, can result in significantly increased message communication traffic and a long processing delay to acknowledge reception of the group page from the members of the large group of selective call transceivers 130, 132, 134. The increased message communication traffic and the long processing delay can bottle-neck message communication traffic in the selective call system 100. This bottle-neck condition and the associated communication delays can severely inconvenience subscribers of the selective call system 100. The selective call system 100 can improve the overall message communication throughput and avoid a bottle-neck condition by, for example, temporarily inhibiting the wireless transmission of the ack-back responses 128 from the large group of selective call transceivers 130, 132, 134, until a later time and while maintaining reliable wireless message communication for the group page, as will be more fully discussed below.

In summary, under a number of acknowledge-back paging conditions, as discussed above, it can be undesirable, and even unnecessary, for the at least one selective call transceiver 130 to immediately transmit back to the central system 102 a confirmation via the ack-back response 128. It can be more advantageous for the ack-back response 128 to be transmitted at a later time, and under different message traffic conditions, as will be more fully discussed below.

The at least one selective call transceiver 130 can be selectively addressed by the selective call system 100 by transmitting a page 126 that comprises address information that matches predetermined address information at the at least one selective call transceiver 130. For example, the at least one selective call transceiver 130 comprises an address memory that contains a first predetermined address information 140 and a second predetermined address information 142. The selective call transceivers 130, 132, 134, in the selective call system 100 likewise can be configured with predetermined address information to be selectively addressable by more than one address in the selective call system 100.

For example, the second selective call transceiver 132 comprises a first predetermined address 144, i.e., with an exemplary address value of 3, and a second predetermined address 146, i.e., with an exemplary address value of 4. Additionally, a third selective call transceiver 134 comprises a third predetermined address 148, with an exemplary address value of 5, and a second predetermined address 150, with an exemplary address value of 6. The selective call transceivers 130, 132, 134, individually comprising a plurality of predetermined addresses can each be selectively addressed by the selective call system 100 transmitting a page 126 comprising address information that matches at least one of the plurality of predetermined addresses of the selective call transceivers 130, 132, 134.

The at least one selective call transceiver 130, for example, is configured to be individually selected by a page 126 comprising address information that matches a second predetermined address information 142 at the selective call transceiver 130. Further, the at least one selective call transceiver 130 can be a member of a large group of selective call transceivers 130, 132, 134, that is selectively addressable by a group address that matches the first predetermined address information 140 of the at least one selective call transceiver 130. This group addressing scheme will be more fully discussed below.

An addressing scheme for an acknowledge-back group can utilize a common predetermined address information for each of the members of the acknowledge-back group. For example, the first predetermined address 140 at the at least one selective call transceiver 130, and the first predetermined address 144 at the second selective call transceiver 132, and the first predetermined address 148 at the third selective call transceiver 134 all match the same group address information for an acknowledge-back group. In this way, the selective call system 100 can transmit a page comprising a single group address to select all the members of the acknowledge-back group.

Alternatively, members of the acknowledge-back group can each have different predetermined address information mapped to the acknowledge-back group at the central system 102. In this group addressing scheme, the selective call system 100 transmits a group page comprising a plurality of addresses for selectively addressing all of the members of the acknowledge-back group.

Of course, a combination of the two addressing schemes discussed above can also be utilized by an selective call system 100 whereby a portion of the members of an acknowledge-back group are selectively addressed by a single group address while the remaining members of the acknowledge-back group are each selectively addressed by different address information. The group page, in this case, would comprise a plurality of addresses for selectively addressing all of the members of the acknowledge-back group.

Therefore, the at least one selective call transceiver 130 comprising a plurality of predetermined address information 140, 142, can be selectively addressed by the selective call system 100 as an individual subscriber to the selective call system 100 or as a member of an acknowledge-back group in the selective call system 100.

According to the preferred embodiment of the present invention, the selective call system 100 can determine when the at least one selective call transceiver 130 should not immediately transmit back an acknowledge-back confirmation response, e.g., the ack-back response 128, to acknowledge a message reception status of a previously transmitted page 126.

For example, if the selective call transceivers 130, 132, 134, are members of a large acknowledge-back group, the selective call system 100 inhibits the wireless transmission of the ack-back responses 128 from the members of the large acknowledge-back group. The members of the large acknowledge-back group inhibit their ack-back responses 128, as a first example, by recognizing that they received a group page 126 and that they are members of the acknowledge-back group being selectively addressed by the group page 126. The selective call transceivers 130, 132, 134, for example, are pre-configured to recognize their membership in the acknowledge-back group. The members of the large acknowledge-back group inhibit their ack-back responses 128, as a second example, by receiving an instruction in the group page 126, such as within a page header field (not shown) in the group page 126, that instructs the members of the large acknowledge-back group to inhibit wireless transmission of their ack-back responses 128 for the group page 126.

Figure 2:
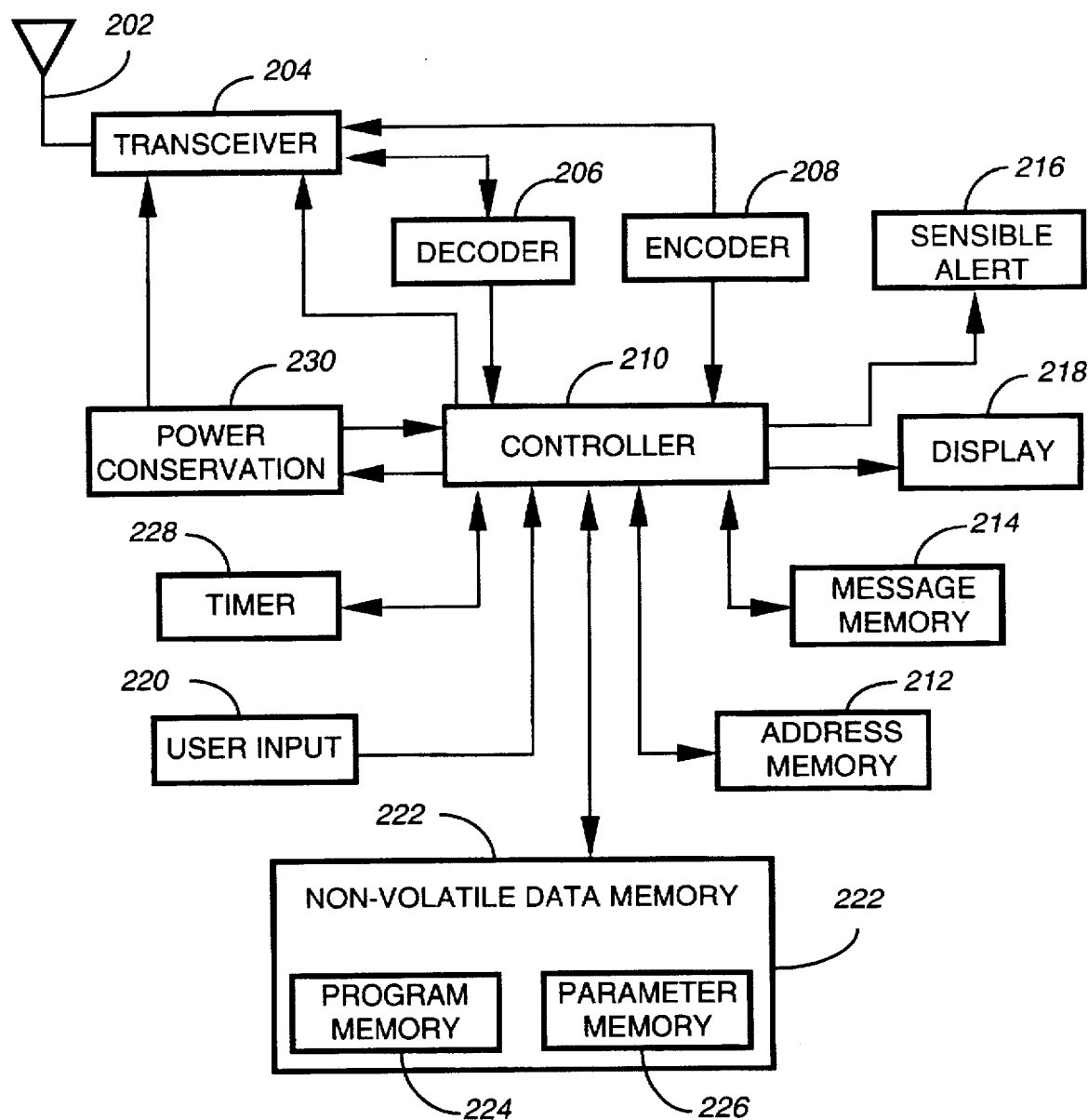
FIG. 2 illustrates an acknowledge-back selective call transceiver in accordance with the present invention.

The at least one selective call transceiver 130, for example, can save its ack-back response 128 for transmission at a later time, such as when conditions have changed for the communication channel for the selective call system 100. The at least one selective call transceiver 130, according to the preferred embodiment of the present invention, can wirelessly transmit its ack-back response 128 as part of a subsequent transmission to the central system 102, which will be more fully discussed below. In this way, the message communication throughput and the message communication reliability of the selective call system 100 are maintained at relatively high levels during varying message communication traffic conditions, and where an ack-back response 128 for every page 126 is not always necessary at the present time. Referring to FIG. 2, an selective call transceiver 130 is shown according to the preferred embodiment of the present invention. The selective call transceiver 130 preferably operates under the ReFlex protocol to receive pages 126 from the central system 102 and to transmit ack-back responses 128 back to the central system 102. However, any conventional wireless communication protocol that supports two-way paging communication can be utilized by the selective call transceiver 130 as supported by the selective call system 100.

The selective call transceiver 130 comprises an antenna 202 coupled to a transceiver 204 for receiving and for wirelessly transmitting messages in the selective call system 100 of FIG. 1. The transceiver 204 includes a receiver for receiving pages that were wirelessly transmitted in the selective call system 100. The wireless transceiver 204 also includes a transmitter for wirelessly transmitting an acknowledge-back confirmation response.

A decoder 206 is coupled to the transceiver 204 and to a controller 210 for decoding received messages, such as from pages 126 destined for the selective call transceiver 130. An encoder 208 is coupled to the transceiver 204 and to the controller 210 for encoding messages that are transmitted from the selective call transceiver 130 to the central system 102, such as the ack-back response 128. The controller 210 is coupled to the transceiver 204 via a control line to control the mode of operation of the transceiver 204, such as for receiving messages or for transmitting messages via the antenna 202.

The controller 210 is coupled to an address memory 212 that is preferably a non-volatile memory. The address memory 212 stores the predetermined address information, such as the first predetermined address 140 and the second predetermined address 142 shown in FIG. 1. When the decoder 206 decodes a page and couples the information associated with the page to the controller 210, the controller 210 compares the address information from the page to the predetermined address information stored in the address memory 212. If the controller 210 determines a match exists between the address information from the page and the predetermined address information in the address memory 212 then the controller 210 stores an acknowledge-back message from the page into a message memory 214. The message memory 214 is preferably a non-volatile memory, such as battery backed-up RAM.

The controller 210 is coupled to a sensible alert means 216, such as an audible alert transducer or a tactile alert transducer. The audible alert transducer provides an audible alert to a user of the selective call transceiver 130, while the tactile alert transducer provides a silent alert to the user. The type of alert that is provided to a user will typically be pre-configured by a selection made by the user via a user input means 220 that is coupled to the controller 210. The user input means 220 may comprise buttons, keys, touch pads, or switches, such as for providing a user of the selective call transceiver 130 with a means of entering information and controlling the functions of the selective call transceiver 130. Consequently, after the controller 210 determines a match exists between the address information from the page and a predetermined address in the address memory 212, the controller 210 alerts, either audibly or silently as configured for the selective call transceiver 130, the user of the selective call transceiver 130 via the sensible alert means 216 that a page has been received.

The controller 210 is coupled to a display 218, for providing visual information to the user of the selective call transceiver 130. The display 218 preferably comprises a liquid crystal display. The display 218, the user input means 220, and the sensible alert means 216, constitute a user interface for the user of the selective call transceiver 130.

When the user is informed of the reception of the page, such as via the sensible alert means 216, the user can operate the user input means 220 to request that the received acknowledge-back message be displayed on the display 218. The controller 210, in response to the activated user input means 220, couples the acknowledge-back message from the message memory 214 to the display 218 for viewing by the user. Furthermore, the user can operate the user input means 220 to send a message back to the central system 102 and thereby to a caller, such as a message originating device 104. The user would send the message as part of an ack-back response 128 transmitted from the selective call transceiver 130. The user configures a message to be included with the ack-back response 128, or the user selects one message from a set of pre-configured messages to include in the ack-back response 128, or the user may utilize a combination of both methods.

The controller 210 is coupled to a non-volatile data memory 222 that can alternatively comprise a program memory 224, a parameter memory 226, other non-volatile data storage, or a combination thereof as may be configured for the selective call transceiver 130 for a particular implementation of the selective call system 100. The non-volatile data memory 222 can store information that is updated by the controller 210 using information from a message provided by at least one page received by the selective call transceiver 130, as will be more fully discussed below.

For example, a computer program is stored in the program memory 224. The computer program, for example, provides instructions and data for controlling execution of functions performed by a computer. The computer, in a first exemplary configuration, comprises the controller 210. However, the computer does not have to include the controller 210, and, in a second exemplary configuration can include a computing device that is external to the selective call transceiver 130 and coupled thereto via a computer interface (not shown) in a manner well known in the art.

The controller 210 upon receiving a page 126 retrieves a message from the page 126 and utilizes information from the message to update the computer program that is stored in the program memory 224. This page 126, in one system implementation, comprises an acknowledge-back group page for providing an efficient and reliable means for mass distribution of software updates that are transmitted through wireless communication in the selective call system 100 to members of an acknowledge-back group in the selective call system 100. By utilizing an acknowledge-back group page to mass distribute the software updates, the selective call system 100 can confirm the reliable reception of the software updates by the members of the acknowledge-back group by monitoring the ack-back responses 128 from the selective call transceivers 130, 132, 134, that are members of the acknowledge-back group. Further, by inhibiting wireless transmission of ack-back responses 128 from the selective call transceivers 130, 132, 134, at the present time, and by deferring transmissions of the ack-back responses 128 to a later time, the selective call system 100 can level its wireless message communication traffic loads over time and maintain a relatively high wireless message communication throughput while reliably delivering the software updates to the members of the acknowledge-back group, as will be more fully discussed below.

In a similar fashion, the data stored in the parameter memory 226 can be updated through pages 126 in the selective call system 100. The selective call system 100 can defer transmissions of the ack-back responses 128 from the selective call transceivers 130, 132, 134, to a later time to maintain a relatively high wireless message communication throughput while reliably delivering the data updates. Additionally, in likewise fashion, a database stored in the non-volatile data memory 222 could similarly be updated via reliable wireless message communication in the selective call system 100.

A timer 228 is coupled to the controller 210 for providing time and date information to the controller 210. The controller 210 could utilize the time and date information provided by the timer 228, for example, to activate or disable functions for the selective call transceiver 130 at predetermined times. The controller 210 is also coupled to a power conservation module 230 that is further coupled to the transceiver 204 to conserve power in a power source not shown during predetermined time intervals in accordance with a power conservation scheme. In one preferred mode of operation, the central system 102 can transmit at least one group page to the selective call transceivers 130, 132, 134, that are members of an acknowledge-back group to inform the selective call transceivers 130, 132, 134, when a subsequent group page will be transmitted to them. The subsequent group page would contain, for example, a large message comprising a software update. By informing the selective call transceivers 130, 132, 134, of a future time interval when the software update will be transmitted in the selective call system 100, it also instructs the selective call transceivers 130, 132, 134, to override a power off state and to make certain that the selective call transceivers 130, 132, 134, will be turned on and operating to receive the subsequent group page during the future time interval. Therefore, the timer 228 at the selective call transceiver 130 and the timer 116 at the central system 102 can help the selective call system 100 schedule messages, such as long messages in acknowledge-back group pages, to time intervals where message communication traffic is expected to be much lower. This can additionally help to level message communication traffic over time in the selective call system 100 to maintain a relatively high message communication traffic throughput while reliably delivering messages to subscribers of the selective call system 100.

Figures 3, 4:
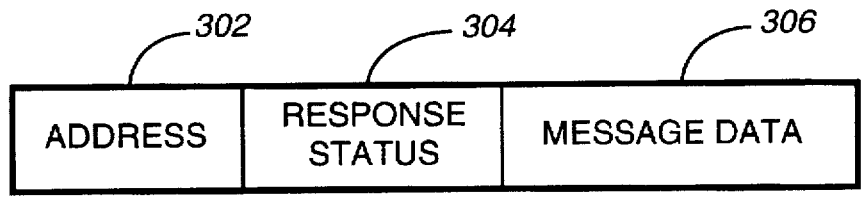
FIG. 3 is a protocol diagram illustrating an acknowledge-back page in accordance with the present invention.
FIG. 4 illustrates an exemplary acknowledge-back message database for use with an acknowledge-back central system of FIG. 1, in accordance with a preferred embodiment of the present invention.

Referring to FIG. 3, an exemplary page 300 is shown, in accordance with a preferred embodiment of the present invention. The page 300 comprises address information that can include one or more addresses for selectively addressing an selective call transceiver 130 as an individual subscriber or for addressing a group of selective call transceivers 130, 132, 134, in the selective call system 100. Optionally, a response status information 304 is included in the page 300 to indicate to the selective call transceiver 130 certain information relating to an page or to an acknowledge-back confirmation response from the selective call transceiver 130, as will be more fully discussed below.

The response status information 304 preferably includes message identification information (not shown), such as a message identification number, that identifies a message, such as the message being transmitted with the page 300. Optionally, the response status information 304 also includes address information coupled to the message identification information to identify a message transmitted in a page.

The selective call transceiver 130 and the central system 102 can utilize the message identification number to communicate between each other a message reception status, or other information, associated with the message identified by the message identification number. As a first example the response status information 304 includes an instruction to instruct the selective call transceiver 130 to remain powered on during a future time interval to operate to receive a subsequently transmitted page 300 during the future time interval, as has been discussed above with respect to the timer 228. Further, the response status information 304, as a second example, includes an instruction to instruct the selective call transceiver 130 to inhibit the wireless transmission of an ack-back response 128 at the present time. Alternatively, when an ack-back response 128 is desired by the central system 102, the response status information 304 includes an instruction to instruct the selective call transceiver 130 to wirelessly transmit the ack-back response 128. The central system 102 also can instruct the selective call transceiver 130 via an instruction in the response status information 304 to wirelessly transmit the ack-back response 128 during a predetermined time interval and according to other communication parameters for the selective call system 100.

The central system 102 optionally includes in the response status information 304 of a current page 300 a message identification information, such as a message identification number, and/or address information, to identify a message that was transmitted in a previous page 300. The selective call transceiver 130 would subsequently transmit an ack-back response 128 in response to the current page 300. The ack-back response 128 would include an acknowledgment including a message reception status information for the message that was transmitted in the previous page 300. The message reception status information would include, for example, a message identification number and/or address information to identify the message transmitted in the previous page 300. In this way, the central system 102 can affirmatively request that the selective call transceiver 130 transmit an acknowledgment for a particular message that was previously transmitted thereto, and to include the acknowledgment in the ack-back response 128 in response to the current page 300.

Note that including in the response status information 304 of the current page 300 an express identification of a message transmitted in a previous page 300 is an optional feature. For example, the selective call transceiver 130 can be pre-configured to always respond in the current ack-back response 128 with a message reception status information indicating a message reception status of at least one previously transmitted message, such as a previously transmitted message whose ack-back response 128 was previously inhibited from wireless transmission back to the central system 102.

The use of the response status information 304 is optional for an selective call system 100. For example, an selective call transceiver 130 is pre-configured to inhibit wireless transmission of an ack-back response 128 as a response to an acknowledge-back group page. In this case, the selective call transceiver 130 stores information for the ack-back response 128, such as in the message memory 214, to include the information in a subsequent ack-back response 128 that would respond to both a subsequent page 126 and to the current page 126.

Additionally, the page 300 comprises message data 306 which constitutes the acknowledge-back message being transmitted with the page 300. The message data 306, for example, includes an information service update, or a computer program update, or a data update, as discussed above, that is destined for reception by a group of selective call transceivers 130, 132, 134.

Referring to FIG. 4, an exemplary acknowledge-back message database 400 for a group of selective call transceivers 130, 132, 134, is shown according to the preferred embodiment of the present invention. The acknowledge-back message database 400 for the group can be stored in the confirmation response tracking database memory 118 that is shown in FIG. 1. The central system, 102 utilizes the acknowledge-back message database 400 to keep track of acknowledge-back paging status for members of an acknowledge-back group. The central system 102 updates the acknowledge-back paging status for the members of the acknowledge-back group as the central system 102 receives and processes ack-back responses 128 from the members of the acknowledge-back group, as will be more fully discussed below.

In this example, the acknowledge-back message database 400 comprises information for a message destined for reception by members of an acknowledge-back group. The acknowledge-back message database 400 for the group, in this example, is identified by an acknowledge-back group identification number and a message identification number. In this case, the group identification number is one and the message identification number is one. The acknowledge-back message database 400, therefore, tracks acknowledge-back paging status information for message number one destined for reception by the members of the acknowledge-back group number one.

Each of the group members is identified by an address that corresponds to the particular group member, as illustrated by the group member address column 402. In this example, the acknowledge-back group comprises the selective call transceivers 130, 132, 134, that are shown in FIG. 1. The first predetermined address 140, 144, 148, for each of the selective call transceivers 130, 132, 134, respectively, comprises a common group address. The second predetermined address 142, 146, 150, for each of the selective call transceivers 130, 132, 134, respectively, comprises an individual acknowledge-back address for each of the selective call transceivers 130, 132, 134. In the acknowledge-back message database 400 for the group, in this example, the members of the acknowledge-back group are preferably identified by their individual subscriber acknowledge-back addresses. This is illustrated in the group member address column 402.

The next column in the acknowledge-back message database 400 indicates acknowledge-back reception status 404 for each of the members of the acknowledge-back group. At the present time interval, as shown, none of the group members have acknowledged reception of a wirelessly transmitted page 300. However, when an acknowledge-back confirmation response is received by the central system 102 from one of the members of the acknowledge-back group number one for message number one, the central system controller 110 (FIG. 1) would update the acknowledge-back message database 400 for that particular member to indicate a reliable reception thereby of a previously transmitted page 300 comprising message number one.

Optionally, the acknowledge-back message database 400 also keeps track of time and date information for scheduling when a next page 300 is to be sent to members of the acknowledge-back group number one that require a re-transmission of the page 300, as indicated by the acknowledged message reception status 404 for the members of the acknowledge-back group. The re-transmission of the page 300, of course, would also include message number one. The next time and date for transmitting the page 300 is preferably maintained in the acknowledge-back message database 400 for each of the members of the acknowledge-back group number one, for message number one, as shown in the next group page time and date column 406. The central system 102 can re-transmit the page 300 selectively addressing those members of the acknowledge-back group that still have not confirmed a reliable reception of the message number one. A re-transmission of the page 300 can preferably be scheduled at a certain time interval where the members of the acknowledge-back group that still have not confirmed a reliable reception of the message number one will be ready to receive the page 300.

Further, the re-transmission time interval can be selected by the central system 102 such that the message communication traffic capacity during such time interval would be capable of handling the additional message communication traffic due to the page 300. The central system 102, for example, communicates the selected future time interval to the members of the acknowledge-back group by transmitting a page 300 that includes a response status information 304 identifying the next time interval for transmission of message number one. In this way, the central system 102 can re-transmit the page 300 comprising the message number one, such as on a periodic basis, until most of the members of the acknowledge-back group have responded that they reliably received the message number one. The remaining members that have not responded to the page 300, or to re-transmissions thereof, over a predetermined amount of time, could be handled by the selective call system 100 in a number of ways. As a first example, a system operator could attempt to individually contact the remaining members that did not reliably receive the message number one. To contact the remaining members, for example, the operator sends individual pages to the remaining members. As a second example, the selective call system 100 could flag these members to receive periodic group pages that would include a brief message informing the subscribers to contact the central system to receive message number one, such as via a telephone modem communication.

Figure 5:
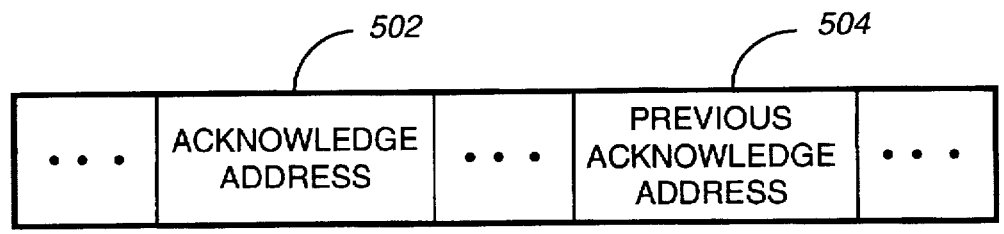
FIG. 5 is a protocol diagram illustrating an acknowledge-back confirmation response in accordance with the preferred embodiment of the present invention.

Referring to FIG. 5, an acknowledge-back confirmation response 500 from an selective call transceiver 130 is shown, according to the preferred embodiment of the present invention. The acknowledge-back confirmation response 500 (ack-back response) comprises an acknowledgment for a page. The acknowledgment preferably includes a message reception status information 502 that comprises an address information for indicating to the central system 102 the particular predetermined address of an selective call transceiver 130 that is being acknowledged by the ack-back response 500. Further, a message identification information (not shown), such as a message identification number, is preferably coupled to the address information in the message reception status information 502 in the acknowledgment to affirmatively identify to the central system 102 the particular message that is being acknowledged by the acknowledgment in the ack-back response 500.

The ack-back response 500 can also include an acknowledgment to a previous page. This acknowledgment preferably includes a message reception status information 504 that comprises address information coupled to a message identification information, such as a message identification number (not shown), to acknowledge back to the central system 102 a message reception status of a previously transmitted page 300. The previously transmitted page 300 comprised a message identified by the message identification number. The address information of the message reception status information 504 corresponds to a predetermined address for the selective call transceiver 130. It also corresponds to address information in the previously transmitted page 300 having been transmitted for reception by the selective call transceiver 130. Note that the message identification information, such as the message identification numbers, are optionally included in the ack-back response 500.

In summary, the selective call transceiver 130 can confirm both the current page 300 message reception status and at least one previous page 300 message reception status by transmitting a single ack-back response 500 to the central system 102. The selective call system 100 gains significant advantages by utilizing a single ack-back response 500 to acknowledge two or more previously received pages 300 at the selective call transceiver 130. For example, as discussed before, the selective call system 100 can increase communication traffic efficiency during certain high message communication traffic periods of time by inhibiting a wireless transmission response from the selective call transceiver 130 during that period of time, and then delivering that response in a subsequent wirelessly transmitted ack-back response 500 from the selective call transceiver 130, such as when wireless message communication traffic is lower for the selective call system 100.

This mechanism for inhibiting and then deferring a confirmation response to be included as part as a wireless transmission of a subsequent ack-back response 500 can be very useful for reliably distributing a wireless broadcast message to a large group of subscribers, such as for delivering computer program updates over a wireless communication channel for the selective call system 100. The subscribers that receive a page 300 comprising a computer program update message do not immediately respond with a confirmation of a message reception status therefor. Instead, for example, they can include the confirmation response as part of a subsequent ack-back response 500 that is normally responding to a subsequently transmitted page 300 for the particular subscriber.

In this way, the selective call system 100 can avoid handling a large number of acknowledge-back confirmation responses over a relatively short time interval for confirming reception of a computer program update, which could unreasonably delay, or potentially block, message communication traffic in the selective call system 100. The selective call transceivers 130, 132, 134, for example, can confirm back to the central system 102 their message reception status for the computer program update as part of subsequent ack-back responses 500 that are also responding to other pages 300. These subsequent ack-back responses 500 can be transmitted when message communication traffic is experiencing lower traffic conditions for the selective call system 100. This advantageously balances the message communication traffic loads being handled over time by the selective call system 100 to maintain a relatively high message communication throughput over time while reliably delivering the computer program update message to the large group of subscribers of the selective call system 100.

Figure 6:
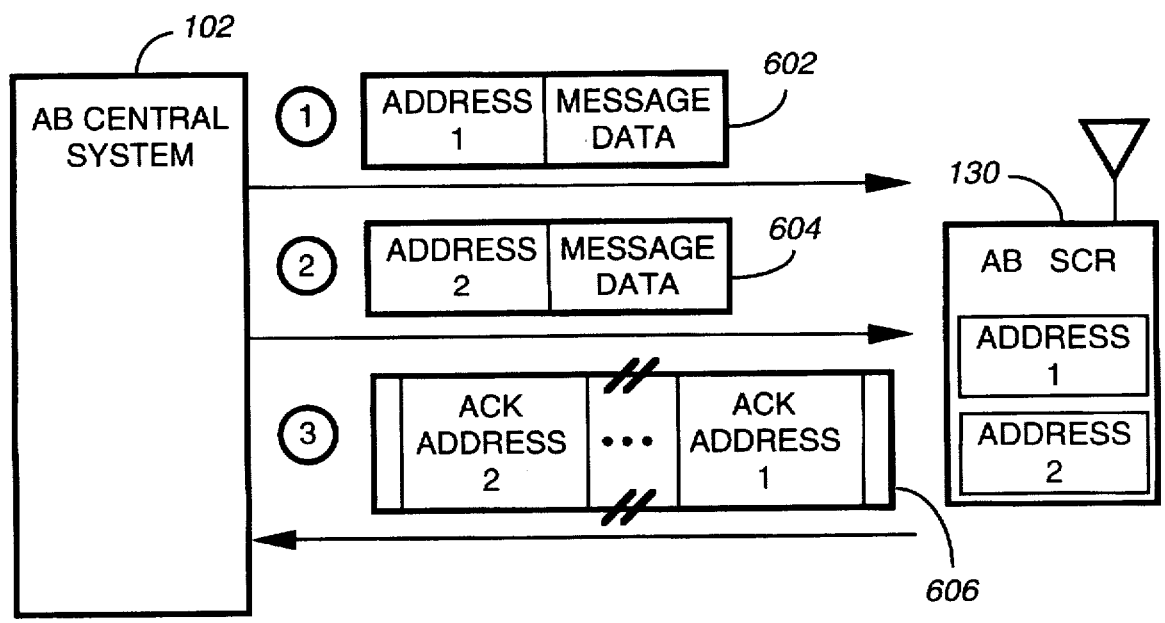
FIG. 6 is a messaging block diagram illustrating an exemplary messaging sequence between an acknowledge-back central system and an acknowledge-back selective call transceiver in accordance with the preferred embodiment of the present invention.

Referring to FIG. 6, an exemplary acknowledge-back paging sequence between the central system 102 and the at least one selective call transceiver 130 is shown, in accordance with the preferred embodiment of the present invention. In a first step, the central system 102 wirelessly transmits a first page 602 for reception by the at least one selective call transceiver 130. In a second step, the central system 102 wirelessly transmits a second page 604 destined for reception by the at least one selective call transceiver 130. In this example, the first page 602 selectively addresses a first predetermined address at the selective call transceiver 130, while the second page 604 selectively addresses a second predetermined address at the selective call transceiver 130. The first predetermined address at the selective call transceiver 130, in this example, is configured as a group acknowledge-back address. The selective call transceiver 130, in response to receiving the first page 602 that selectively addresses the first predetermined address, inhibits transmission of an acknowledge-back confirmation response for the first page 602. In this way, the selective call transceivers 130, 132, 134, that are members of an acknowledge-back group do not immediately respond via wireless transmission to the first page 602 that was destined for reception by a group comprising the selective call transceivers 130, 132, 134.

However, in response to a subsequent page, such as the page 604 that selectively addresses a second predetermined address at the selective call transceiver 130, the selective call transceiver 130 wirelessly transmits to the central system 102 an acknowledge-back confirmation response 606 that includes acknowledgment for the second page 604 and acknowledgment for the first page 602. Therefore, the selective call transceiver 130 wirelessly transmits the acknowledge-back confirmation response 606 to acknowledge both the current page 604 and a previous page 602. The acknowledge-back confirmation response 606, in this example, identifies the acknowledgment to the previous page 602 by including a representation of the address of the previous page 602. In similar fashion in this example, the acknowledgment to the current page 604 includes a representation of the address of the current page 604 as identification of an acknowledgment response thereof.

Figure 7:
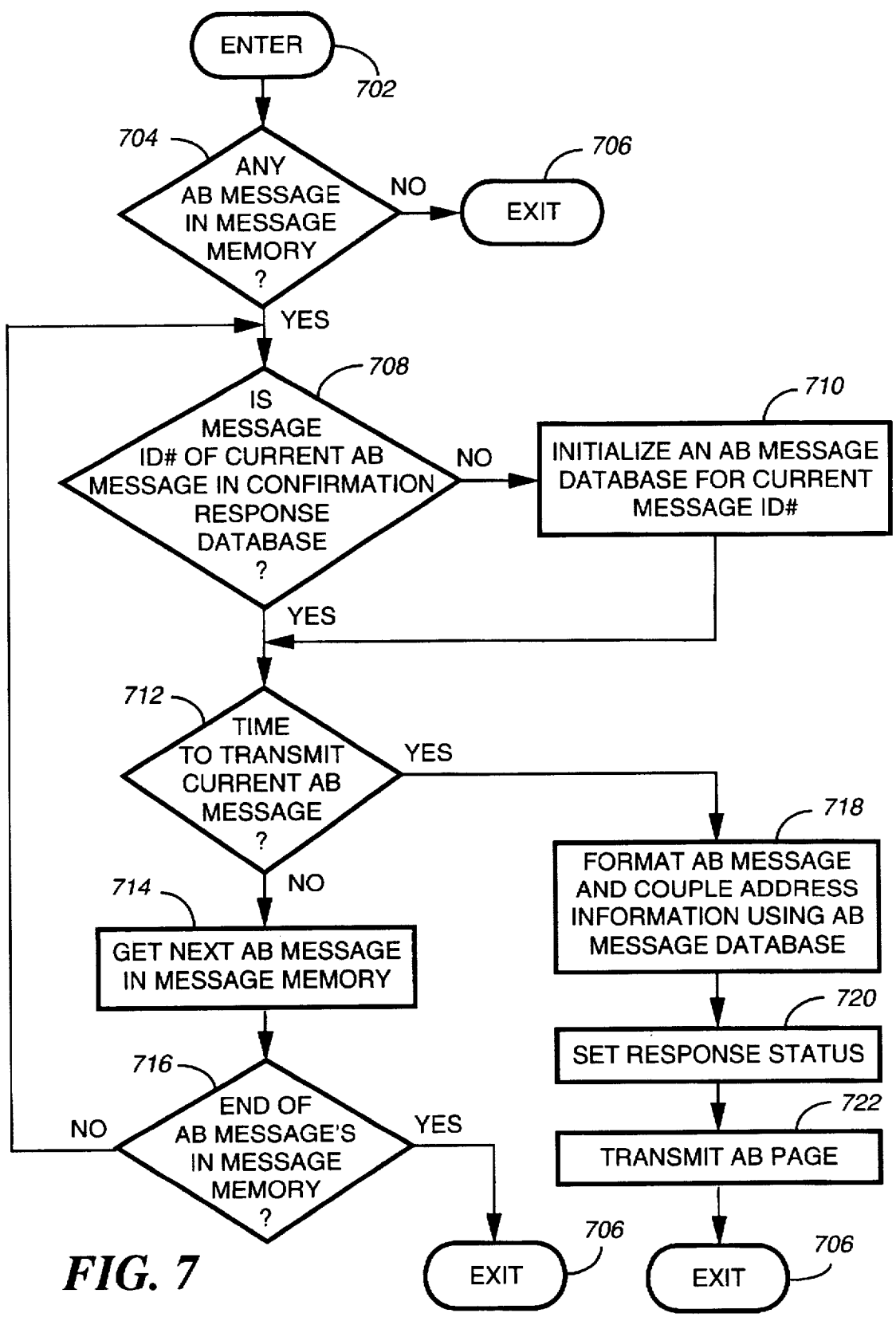
FIGS. 7 and 8 are flow diagrams illustrating a first operational sequence for the acknowledge-back central system of FIG. 1 in accordance with the preferred embodiment of the present invention.
Figure 8:
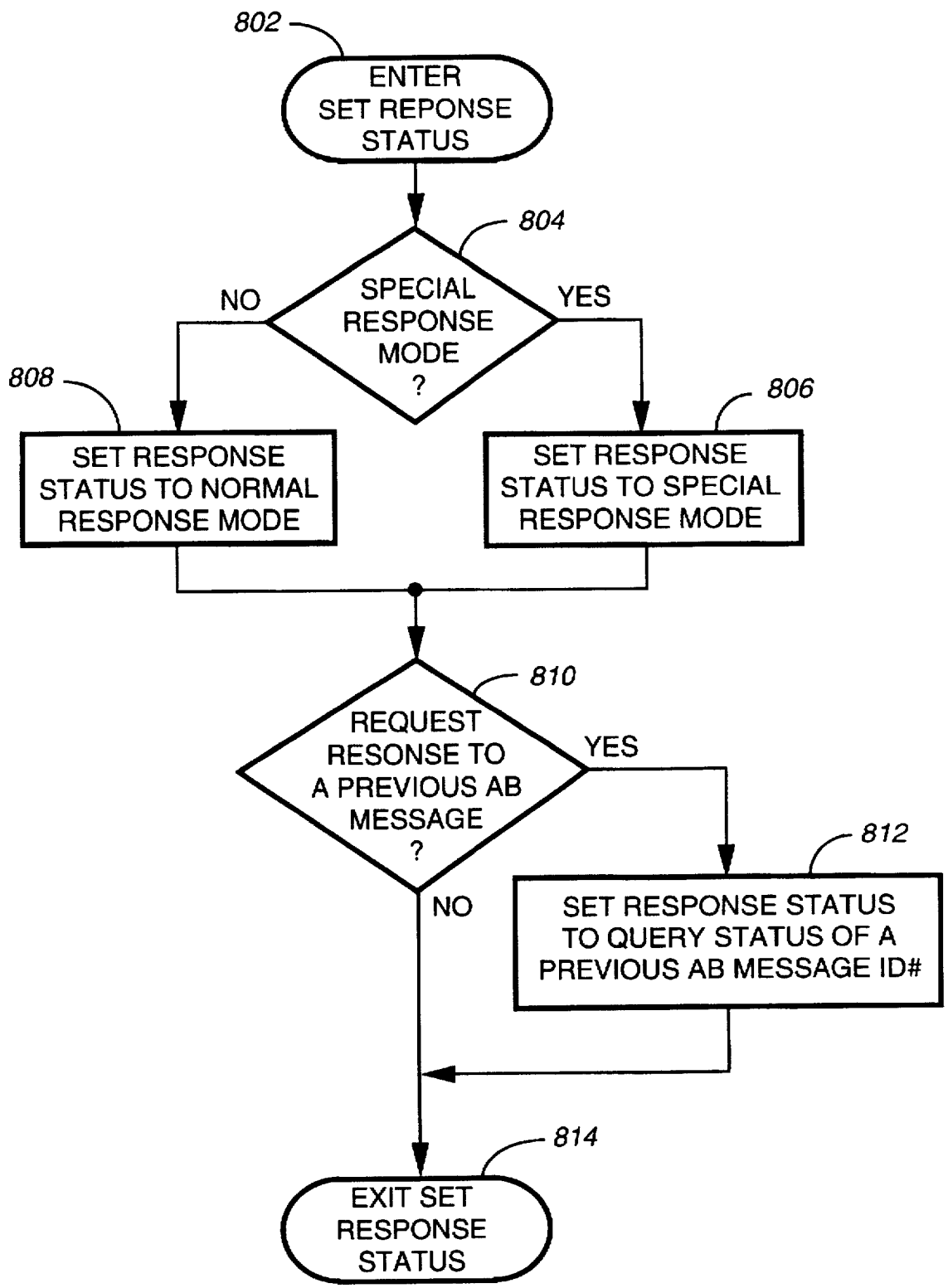
Figure 9:
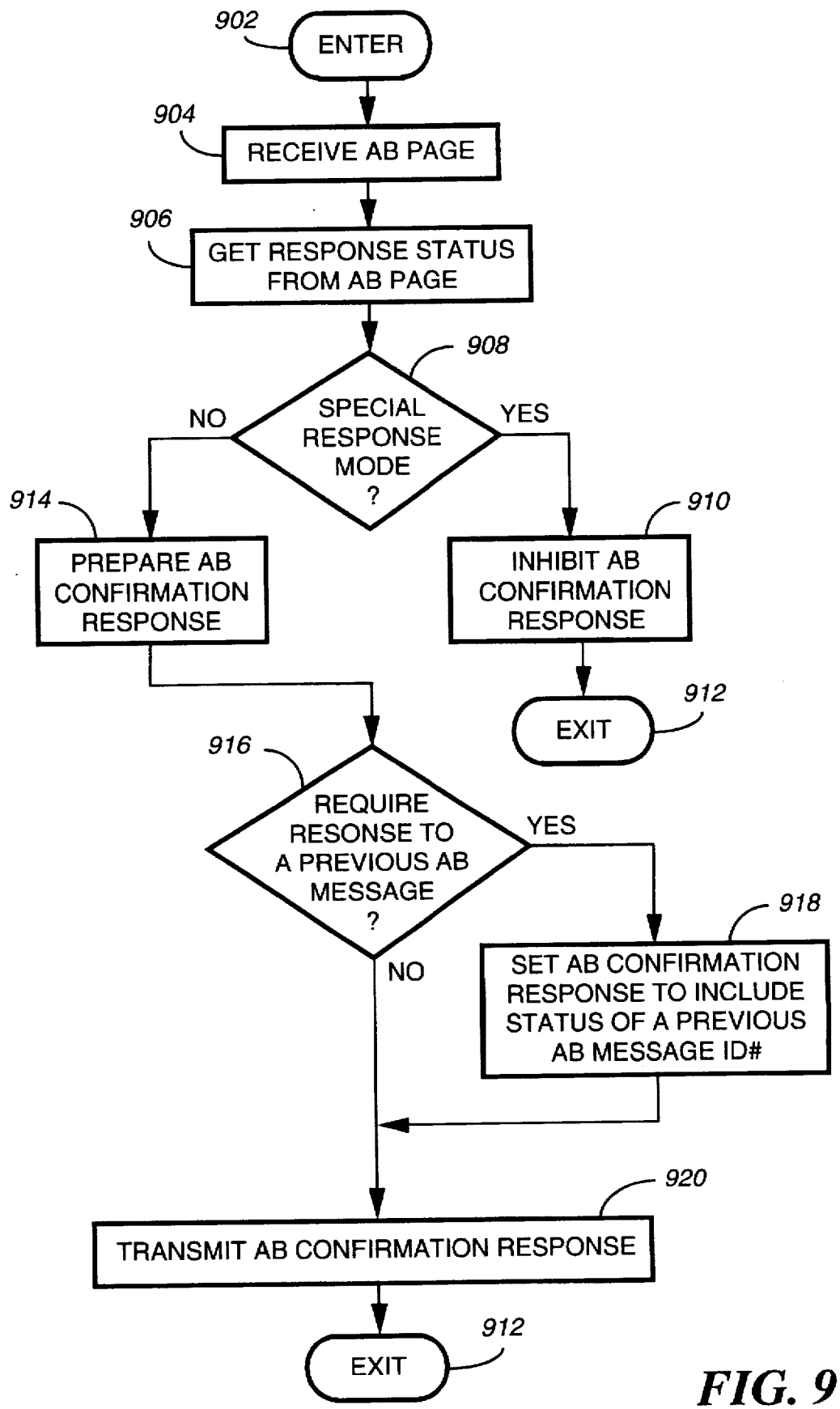
FIG. 9 is a flow diagram illustrating an operational sequence for an acknowledge-back selective call transceiver of FIG. 2 in accordance with the preferred embodiment of the present invention.
Figure 10:
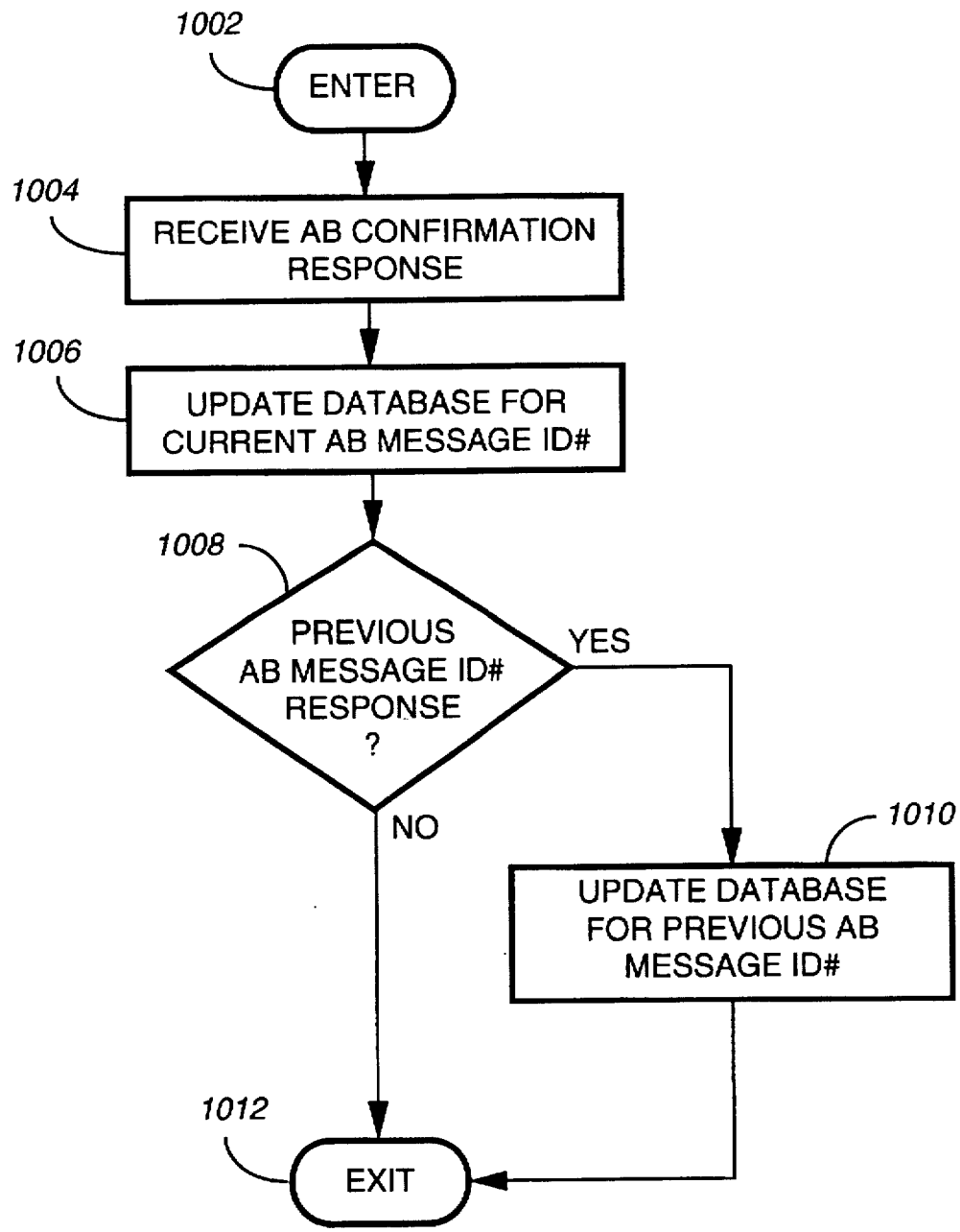
FIG. 10 is a flow diagram illustrating a second operational sequence for the acknowledge-back central system of FIG. 1 in accordance with the preferred embodiment of the present invention.

Referring to FIGS. 7, 8, 9, and 10, the flow diagrams shown illustrate a number of exemplary operational sequences for the selective call system 100 of FIG. 1, including the selective call transceiver of FIG. 2, in accordance with the preferred embodiment of the present invention. FIGS. 7, 8 and 10 illustrate exemplary operational sequences at the central system 102, while FIG. 9 illustrates an exemplary operational sequence at the selective call transceiver 130.

First, in an operational sequence that is not shown in FIGS. 7, 8, 9, and 10, the central system controller 110 (FIG. 1) couples messages comprising address information and message data from the input controller 108 to the message memory 112 for sending pages, such as sending pages, to the selective call transceivers 130, 132, 134, for delivering the messages to subscribers of the selective call system 100. As was discussed above with respect to the message originating device 104 in FIG. 1, the message originating device 104 typically couples requests to send pages to the input controller 108, which then couples the messages to the central system controller 110. The messages are then stored in the message memory 112. Note that the requests can originate via a number of different interfaces between the message originating device 104 and the central system 102, as discussed above.

Referring next to FIGS. 1 and 7, the central system controller 110 enters, at step 702, an operational sequence for controlling an acknowledge-back message transmission process. The central system controller 110 determines whether there are any acknowledge-back messages in the message memory 112 for transmission into the selective call system 100. If there are no acknowledge-back messages in the message memory 112, at step 704, then the central system controller 110 exits this operational sequence, at step 706, and can perform other functions for the central system 102.

On the other hand, if an acknowledge-back message is found in the message memory 112, at step 704, then the central system controller 110, in this example, gets a message identification information, such as a message identification number, associated with the acknowledge-back message in the message memory 112 and checks the confirmation response tracking database memory 118 to determine if an acknowledge-back message database exists for the particular acknowledge-back message identification number, at step 708.

If no acknowledge-back message database exits in the confirmation response tracking database memory 118, at step 708, then the central system controller 110 will initialize an acknowledge-back message database for the current message identification number, at step 710. For example, refer to FIG. 4 for an illustration of an acknowledge-back message database representing an acknowledge-back group identified by the number one and a message identified by the number one.

After the central system controller 110 locates an acknowledge-back message database in the confirmation response tracking database memory 118 for the message identification number for the acknowledge-back message in the message memory 112, the central system controller 110 determines whether it is time to transmit a page with the acknowledge-back message, at step 712. The page would be wirelessly transmitted, in this example, to all the selective call transceivers 130, 132, 134, that are identified in the acknowledge-back message database 400 as having a page reception time that is currently due, as illustrated in FIG. 4. The time to transmit the page in this example is set for Aug. 31, 1995 at 3 am, as shown in the next group page time and date column 406.

If the central system controller 110 determines, at step 712, that the time to transmit the acknowledge-back message is not currently due yet, then the central system controller 110 gets the next acknowledge-back message that is found in the message memory 112, at step 714, to see whether it is time to transmit the next acknowledge-back message. If there are no more acknowledge-back messages found in the message memory 112, at step 716, then the central system controller 110 exits the current operational sequence, at step 706, and can perform other functions for the central system 102. Otherwise, if a next acknowledge-back message is found in the message memory 112, then the central system controller 110 can process the next acknowledge-back message in a similar method, as discussed before for steps 708, 710, and 712, to determine if it is time to transmit the next acknowledge-back message.

When it is time to wirelessly transmit an acknowledge-back message located in the message memory 112, at step 712, the central system controller 110 formats the acknowledge-back message and couples address information thereto to provide a page that can be wirelessly transmitted using a communication protocol such as the ReFlex protocol. The central system controller 110 uses the information in the next group page time and date column 406 of the acknowledge-back message database 400, at step 718, to select the address information that is coupled to the acknowledge-back message to provide the page. In this way, the central system 102 only selectively addresses those selective call transceivers 130, 132, 134, that have an acknowledge page time that is currently due. Additionally, in this example, the central system controller 110 optionally sets a response status information for the page, at step 720. The response status information 304 in the page 300, for example as shown in FIG. 3, can provide additional information to the selective call transceiver 130, 132, 134, such as with respect to the current page or with respect to a previous page, as was discussed above with respect to the response status information 304 of FIG. 3.

After a response status information is optionally added to the page, at step 720, the central system 102 then wirelessly transmits the page, at step 722. The selective call system 100 wirelessly transmits the page into at least one coverage area 124 (FIG. 1) for an acknowledge-back communication channel. The wireless transmission of the page is handled by the central system controller 110 coupled to at least one output controller 114 that routes the page via at least one communication link 120 to at least one base station 122. After the central system controller 110 handles the wireless transmission of the page, at step 722, the central system controller 110 exits the current operational sequence, at step 706, and can perform other functions for the central system 102.

Referring to FIG. 8, when the central system controller 110 determines, at step 720, that a response status information is necessary in the page, the central system controller 110 enters, at step 802, the following operational sequence. First, the central system controller 110 determines, at step 804, whether a special response mode is necessary for the current page.

For example, the central system controller 110 can send an instruction to affirmatively instruct all the recipients of the page to inhibit wireless transmission of an acknowledge-back confirmation response. The central system controller 110, at step 806, sets the response status information in the page to a special response mode such as to inhibit wireless transmission of an acknowledge-back confirmation response from the recipients at this time. Alternatively, at step 808, the central system controller 110 can set the response status information in the page to normal response mode to allow, for example, the recipients of the page to respond with an acknowledgment.

The central system controller 110, at step 810, determines whether the recipients of the page should also respond to a previous acknowledge-back message. If a response is called for, at step 810, the central system controller 110, at step 812, sets the response status information in the page to request a status information of a previous page message that is identified by a message identification information, such as a message identification number. Additionally, address information can be coupled to the message identification information in the response status information to identify the previous page message. The central system controller 110 then, at step 814, exits the current operational sequence and processes the transmission of the page, at step 722, as discussed before for FIG. 7.

Referring to FIG. 9, the controller 210 (see FIG. 2) of the selective call transceiver 130 enters an operational sequence, at step 902, for controlling an acknowledge-back message reception process and an acknowledge-back confirmation response transmission process. After the selective call system 100 transmits a page into at least one coverage area 124, the selective call transceiver 130 operates to receive the page, at step 904. If, for example, the page comprises a computer program update message, then the controller 210 updates a computer program in a program memory 224 by utilizing the computer program update message.

The controller 210 gets the response status information from the page that was optionally included in the page by the central system 102. The controller 210, at step 908, determines whether a special response mode is requested by the central system 102. If a special response mode is requested, at step 908, the controller 210, at step 910, inhibits an acknowledge-back confirmation response from being transmitted back to the central system 102 at this time. The controller 210 then exits the operational sequence, at step 912, and can perform other functions for the selective call transceiver 130.

On the other hand, if a special response mode is not called for, at step 908, then the controller 210 prepares, at step 914, an acknowledge-back confirmation response for immediate wireless transmission back to the central system 102. This acknowledge-back confirmation response, for example, includes an acknowledgment that the message of the current page was successfully received by the selective call transceiver 130. Alternatively, for example, the acknowledgment indicates that the message of the current page was not received by the selective call transceiver 130. Other types of acknowledgment can be included in the acknowledge-back confirmation response to indicate other communication related status with respect to at least one page destined for reception by the selective call transceiver 130.

Additionally, the controller 210 determines, at step 916, whether an acknowledge-back confirmation response is required for a previous acknowledge-back message. This is the case, for example, if the received response status information in the page specifically requests a response to a previous page. However, an acknowledgment to a previous page can be included in the current acknowledge-back confirmation response even if not requested by the central system 102.

For example, a previous acknowledge-back confirmation response was inhibited, as indicated, for example, by information associated with a previous page that is stored in the message memory 214. Specifically, if a previous page comprises, for example, a software update to a computer program resident in program memory 224, or to other data stored in the non-volatile data memory 222, a previous acknowledge-back confirmation response to that page can also be stored in the message memory 214 to indicate to the controller 210 to include the acknowledgment in a subsequent acknowledge-back confirmation response for transmission to the central system 102.

If a response to a previous page is required, at step 916, the controller 210, at step 918, sets the current acknowledge-back confirmation response to include the acknowledgment of a previous acknowledge-back message identified by a message identification information, such as a message identification number. Then, at step 920, the controller 210 and the encoder 208 operate to format and encode the acknowledge-back confirmation response according to a communication protocol such as the ReFlex protocol. The controller 210 then activates the transceiver 204 to transmit the acknowledge-back confirmation response back to the central system 102. After transmitting the acknowledge-back confirmation response, the controller 210 exits the current operational sequence, at step 912, and can perform other functions for the selective call transceiver 130.

Referring to FIG. 10, the central system controller 110 enters an operational sequence, at step 1002, for controlling an acknowledge-back confirmation response reception process, such as for receiving an acknowledge-back confirmation response from the selective call transceiver 130. The central system controller 110 operates with the output controller 114 to receive an acknowledge-back confirmation response, at step 1004. The central system controller 110 stores the received acknowledge-back confirmation response in the message memory 112. Based on the information contained in the acknowledge-back confirmation response 500, as shown in FIG. 5, the central system controller 110 updates an acknowledge-back message database 400, such as shown in FIG. 4, in the confirmation response tracking database memory 118 for an acknowledge-back message identified by a message identification information, such as a message identification number, provided in the acknowledge-back confirmation response, at step 1006.

If the central system controller 110, at step 1008, determines that a previous acknowledge-back message is also being acknowledged in the current acknowledge-back confirmation response, the central system controller 110 then updates, at step 1010, an acknowledge-back message database in the confirmation response tracking database memory 118 for the previous acknowledge-back message identified by a message identification number in the acknowledge-back confirmation response.

After updating at least one acknowledge-back message database in the confirmation response tracking database memory 118, the central system controller 110 exits the current operational sequence, at step 1012. The central system controller 110 can then perform other functions for the central system 102.

In summary, the central system 102 can keep track of those selective call transceivers 130, 132, 134, that responded with an acknowledge-back confirmation response. The central system 102 determines from the received acknowledge-back confirmation responses over time which of the selective call transceivers 130, 132, 134, have reliably received a previously transmitted page. The central system 102 can determine whether a subsequent, duplicate page should be wirelessly transmitted to allow the selective call transceivers 130, 132, 134, an additional opportunity to reliably receive the desired acknowledge-back message. The central system 102, for example, can wirelessly transmit a duplicate page at one or more selected times over a time interval to give the selective call transceivers 130, 132, 134, opportunity to reliably receive the page while maintaining a relatively high message communication traffic throughput for the selective call system 100. By deferring an acknowledge-back communication response from the selective call transceivers 130, 132, 134, to be included as part of subsequent acknowledge-back confirmation responses therefrom, the selective call system 100 can advantageously reduce acknowledge-back confirmation response communication traffic while allowing a higher level of acknowledge-back paging traffic in an acknowledge-back communication channel. The acknowledge-back confirmation response communication traffic can be deferred to a later time interval where the selective call system 100 can better handle the additional traffic. In the case of a one-channel acknowledge-back selective call system using time division multiplexing, the invention will advantageously reduce contention among both the outbound transmissions of the base station and the inbound transmissions of the selective call transceivers. In the case of a supernumerary channel acknowledge-back selective call system using frequency division multiplexing, the invention will advantageously directly reduce contention among inbound transmissions of the selective call transceivers, and, as a result, indirectly permit the immediate transmission of certain outbound messages that require an immediate acknowledgement.

While a detailed description of a preferred embodiment of the invention has been given, it should be appreciated that many variations can be made thereto without departing from the scope of the invention as set forth in the appended claims. Further, the invention is not limited to selective call transceivers, or two-way pagers, but can be used with other types of two-way communication devices, both fixed and portable, both wireless and wireline.

What is claimed is:

1. A method in an acknowledge-back wireless selective call system capable of transmitting multi-recipient acknowledge-back pages destined for reception by a plurality of selective call transceivers and single-recipient acknowledge-back pages destined for reception by a one selective call transceiver of the plurality of selective call transceivers, the method comprising the steps of:

(a) wirelessly transmitting a multi-recipient acknowledge-back page;

(b) receiving the multi-recipient acknowledge-back page by a plurality of selective call transceivers;

(c) at each of the plurality of selective call transceivers, in response to decoding of a page as a multi-recipient page, delaying the transmission of an acknowledgment signal responsive to the multi-recipient acknowledge-back page until after a single-recipient acknowledge-back page is separately, individually received by each of the plurality of selective call transceivers;

(d) subsequent to the step of wirelessly transmitting the multi-recipient acknowledge-back page, wirelessly transmitting a single-recipient acknowledge-back page destined for reception by a one selective call transceiver of the plurality of selective call transceivers;

(e) receiving the single-recipient acknowledge-back page by the one selective call transceiver; and (f) at the one selective call transceiver, in response to decoding of a page as a single-recipient acknowledge-back page, wirelessly transmitting a single acknowledgment signal including information indicating a message reception status for the multi-recipient acknowledge-back page received at step (b), and information indicating a message reception status for the single-recipient acknowledge-back page received at step (e).

* * * * *